(12) United States Patent
Afanasyev

(10) Patent No.: US 8,590,831 B2
(45) Date of Patent: Nov. 26, 2013

(54) FLYING VEHICLE

(76) Inventor: Sergey Nikolaevich Afanasyev, Moscow (RU)

( * ) Notice: Subject to any disclaimer, the term of this patent is extended or adjusted under 35 U.S.C. 154(b) by 397 days.

(21) Appl. No.: 12/931,699

(22) Filed: Feb. 8, 2011

(65) Prior Publication Data
US 2011/0127384 A1    Jun. 2, 2011

Related U.S. Application Data

(63) Continuation of application No. PCT/RU2008/000732, filed on Dec. 1, 2008.

(51) Int. Cl.
*B64C 3/38* (2006.01)
(52) U.S. Cl.
USPC .................. 244/46; 244/49; 244/201
(58) Field of Classification Search
USPC ............. 244/46, 49, 201, 203, 45 R
See application file for complete search history.

(56) References Cited

U.S. PATENT DOCUMENTS

| | | | |
|---|---|---|---|
| 2,683,574 A | | 7/1954 | Peterson |
| 3,063,375 A | * | 11/1962 | Hawley et al. ............. 244/3.27 |
| 4,336,914 A | * | 6/1982 | Thomson ..................... 244/46 |
| 4,569,493 A | * | 2/1986 | Burhans, Jr. ............. 244/76 R |
| 4,664,339 A | * | 5/1987 | Crossfield ................. 244/3.28 |
| 4,667,899 A | * | 5/1987 | Wedertz ...................... 244/49 |
| 4,869,441 A | * | 9/1989 | Steuer ....................... 244/3.28 |
| 5,035,378 A | * | 7/1991 | Spanovich ................... 244/49 |
| 5,192,073 A | * | 3/1993 | Iwanaga et al. ............. 473/289 |
| 5,312,070 A | * | 5/1994 | Arena ........................ 244/46 |
| 5,495,999 A | | 3/1996 | Cymara |
| 5,615,846 A | * | 4/1997 | Shmoldas et al. ........... 244/3.28 |
| 5,671,899 A | * | 9/1997 | Nicholas et al. ............ 244/49 |
| 5,984,231 A | | 11/1999 | Gerhardt et al. |
| 2012/0104179 A1 | * | 5/2012 | Afanasyev .................. 244/213 |

FOREIGN PATENT DOCUMENTS

| | | |
|---|---|---|
| DE | 10 2006 017 135 | 10/2007 |
| RU | 50 977 | 1/2006 |
| RU | 50977 | 1/2006 |

OTHER PUBLICATIONS

International Search Report of PCT/RU2008/000732.

* cited by examiner

*Primary Examiner* — Christopher P Ellis
(74) *Attorney, Agent, or Firm* — Collard & Roe

(57) ABSTRACT

An aircraft includes a fuselage and takeoff and landing wings that are extended at takeoff and landing and serve as the main aerodynamic elements producing the lift. The takeoff and landing wings are in a retracted position in cruising flight to attain a minimum possible drag coefficient of the aircraft and, as a result, reduce fuel requirements in the cruising configuration significantly. When retracted, the takeoff and landing wings are integrated compactly into the fuselage surface. The retracted takeoff and landing wings are fixed in position by retracted position locks of the fuselage. A takeoff and landing wing has a turbine blade profile in cross-section. A takeoff and landing wing has longitudinal rows of slots simulating the operation of a slat and a two-slot flap. The slots are closed with shutters on the outer side of the wing.

5 Claims, 21 Drawing Sheets

FLYING VEHICLE

CROSS REFERENCE TO RELATED APPLICATIONS

Applicant claims priority and this application is a continuation under 35 U.S.C. §120 of International Application No. PCT/RU2008/000732 filed Dec. 1, 2008. The international application under PCT article 21(2) was not published in English.

FIELD OF THE INVENTION

The invention relates to the aircraft industry and can be used in the design of supersonic and subsonic flying vehicles carrying different payloads and serving different purposes.

BACKGROUND OF THE INVENTION

Designers developing piloted flying vehicles capable of taking off and landing on standard landing strips are always confronted with a great challenge. To achieve minimum speeds for taking off or landing, the wing of a flying vehicle is to have a relatively large surface area. A wing of a large surface area, however, always has a high drag coefficient (Cx) that interferes substantially with flight at high speeds. Small surface areas of the wings in the nose and tail parts of an aircraft are enough for flight at cruising speeds. This principle is used, for example, in the U.S. GAM-63 RASCAL tactical cruise missile that can fly at speeds over 3,000 km/hr.

The air forces have long been flying aircraft having variable-geometry wings, for example, the U.S. F-14, Russian SU-22, SU-24, and so on. This design allows an aircraft to take off and land at relatively low speeds, and flight at high speed is made more economical by reducing the Cx of the wing by varying its geometry. Typically, the wing of a modern aircraft has slats, flaps, ailerons, and fuel tanks. These components give a variable geometry wing a very complex design. Its elements have a large size and weight, and are unreliable, complicated, and expensive to make and maintain. For these reasons, a variable-geometry wing is not used in civil aviation.

A prior art aircraft has a pair of wings joined to the fuselage by hinged fitting units and can be turned relative to the axes of the fitting units for movement to the takeoff and landing position during takeoff and landing or to the retracted position in cruising flight or when parked (U.S. Pat. No. 5,984,231 of Nov. 16, 1999).

A drawback of a wing of this aircraft design is that each wing has a single fitting unit that is subjected to high aerodynamic loads as the wing is turned in flight.

Another drawback of this wing design is that the wing configuration continues to develop Cx and fuel requirements of the aircraft are reduced insignificantly.

SUMMARY OF THE INVENTION

It is an object of this invention to develop a reasonably simple and reliable aircraft design to enable modern transport aircraft to take off from, and land on, standard runways and fly at cruising speeds very economically by reducing the Cx of the design to a minimum.

The idea of the invention is that the aircraft design incorporates takeoff and landing wings. The takeoff and landing wings are in an extended position at takeoff and landing and serve as the principal aerodynamic elements of the aircraft design producing the lift. The takeoff and landing wings are retracted in cruising flight and are not involved in lift generation. Their retracted position gives the aircraft a minimum possible Cx of the aircraft structure and reduces significantly fuel requirements in the cruising configuration.

This technical result is achieved by the takeoff and landing wings being integrated compactly into the fuselage surface of the aircraft in the cruising configuration.

DESCRIPTION OF AN EMBODIMENT

Figure 1:
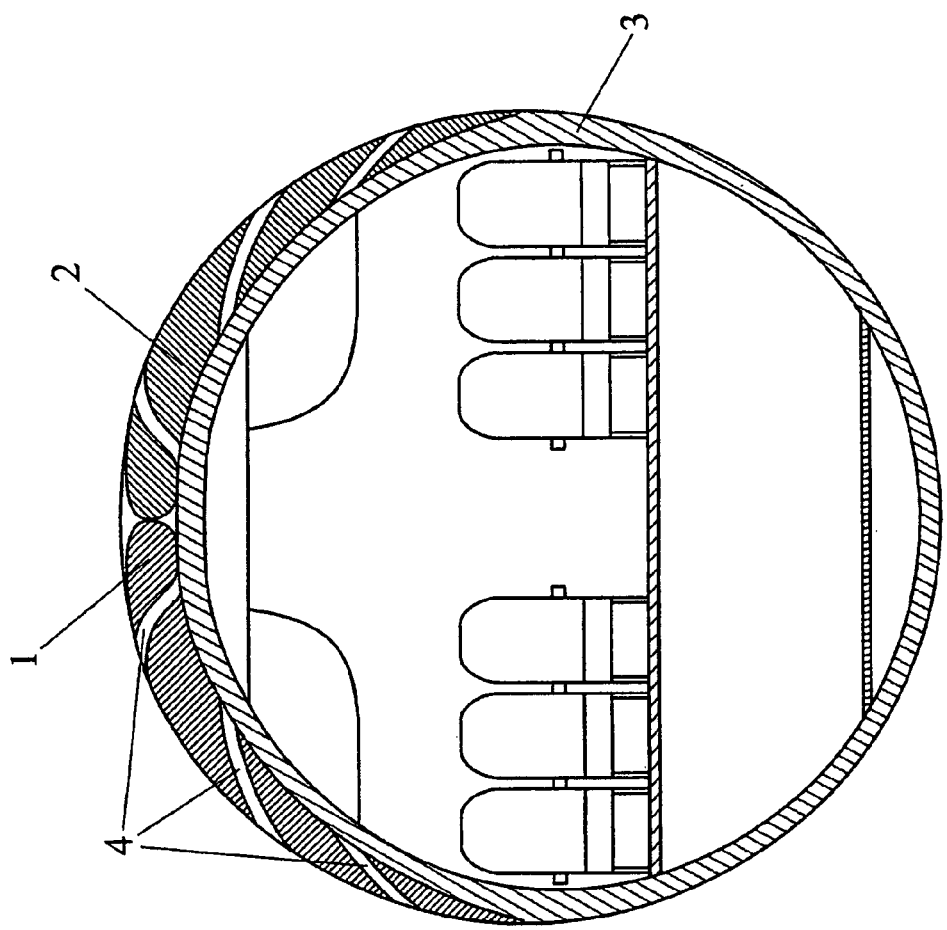
FIG. 1 is a cross-sectional view of the aircraft fuselage with the takeoff and landing wings in the retracted position.
Figure 2:
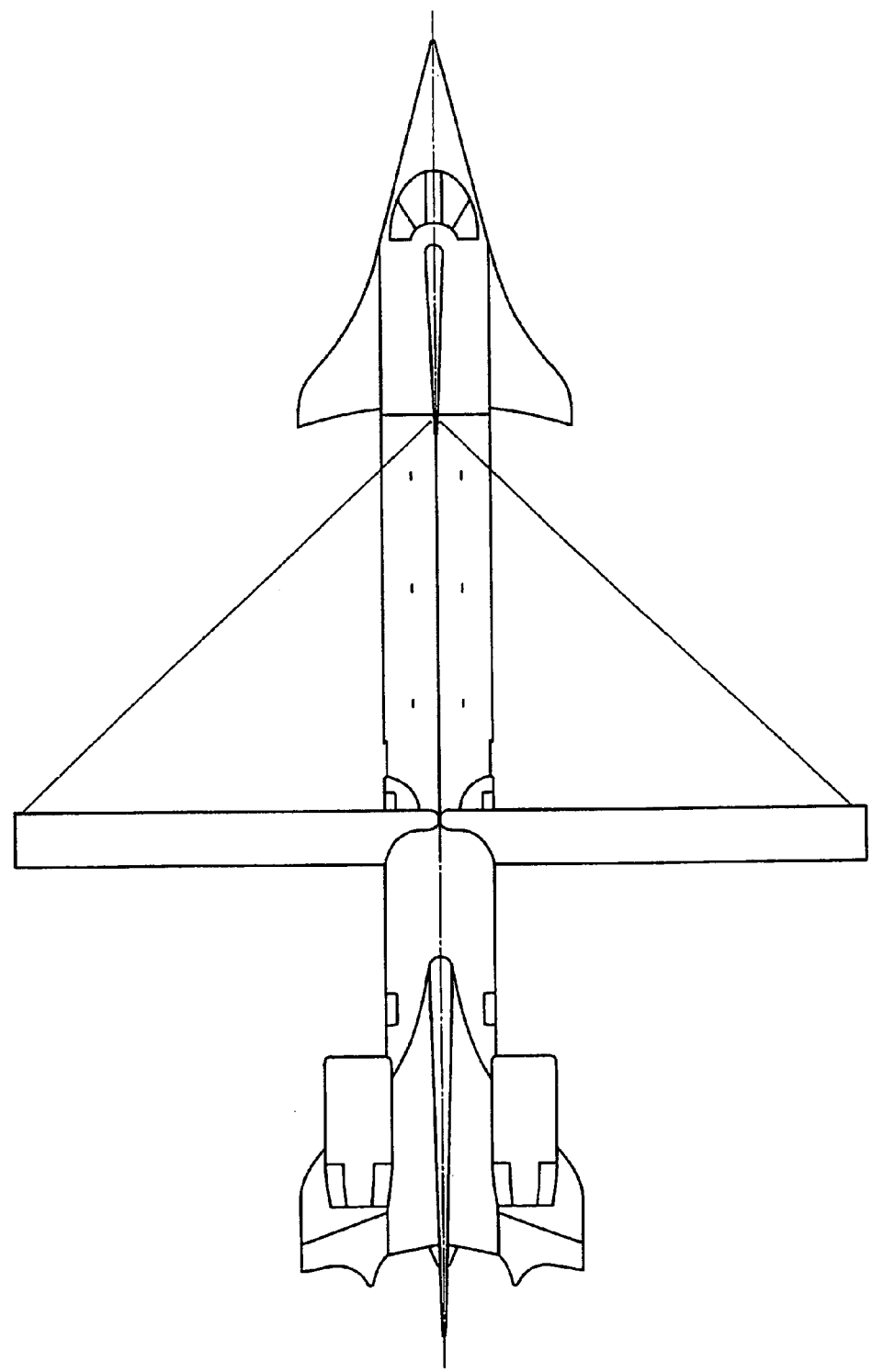
FIG. 2 is a view of an aircraft embodiment having one pair of takeoff and landing wings in the takeoff and landing positions.
Figure 3:
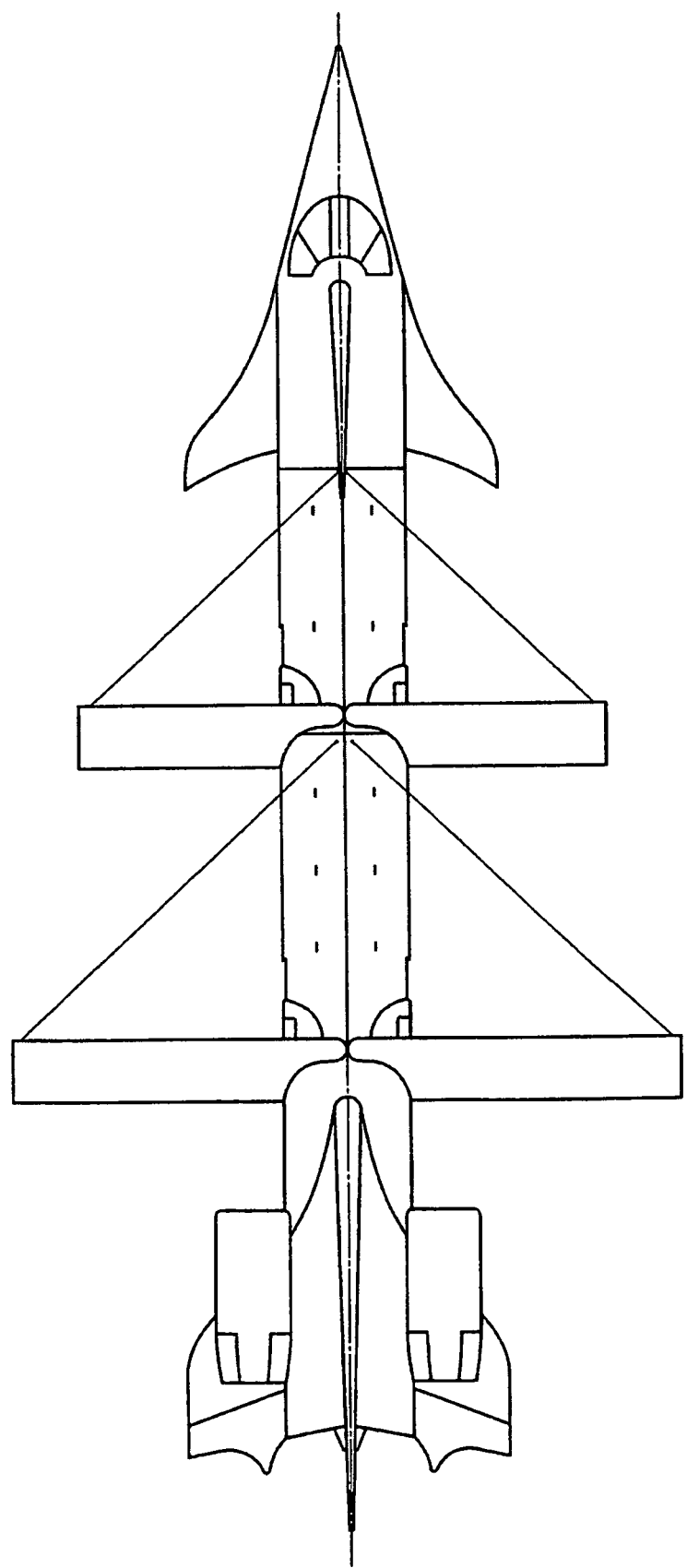
FIG. 3 is a view of an aircraft embodiment having two pairs of takeoff and landing wings in the takeoff and landing positions.
Figure 4:
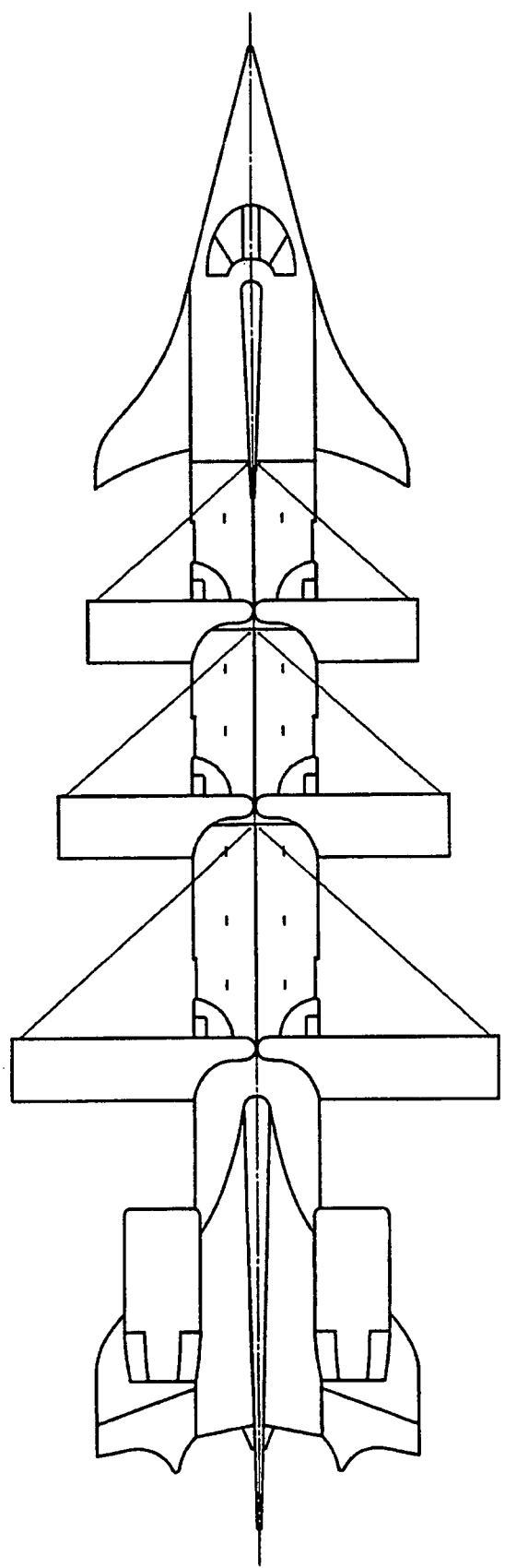
FIG. 4 is a view of an aircraft embodiment having three pairs of takeoff and landing wings in the takeoff and landing positions.

The takeoff and landing wings 1 and 2 of the present aircraft design are integrated compactly into the surface of the fuselage 3 in the retracted position so that the inner surface of the takeoff and landing wings is in contact with the upper surface of the fuselage, and the outer surface of the takeoff and landing wings serves as extension of the outer surface of the fuselage (FIG. 1) such that the aircraft design is fully integrated in the cruising configuration. Each takeoff and landing wing has slots 4 to redirect air from the inner surface of the takeoff and landing wing to the outer surface thereof (FIG. 1). Aircraft integrating takeoff and landing wings into their structure may have one pair of takeoff and landing wings (FIG. 2), two pairs of takeoff and landing wings (FIG. 3), or three pairs of takeoff and landing wings (FIG. 4). The preferred embodiment is an aircraft comprising two pairs of takeoff and landing wings (FIGS. 3 and 5), which will be described below.

The preferred aircraft design (FIG. 5) comprises a fuselage 5 and the main aerodynamic design elements:
1. Horizontal nose empennage 6, its functions performed by fully controlled elevators.
2. Horizontal tail empennage 7 provided with ailerons 8 and engines 9.
3. Vertical tail empennage 10 provided with rudder surfaces 11.
4. Short forward takeoff and landing wings 12.
5. Long aft takeoff and landing wings 13.

The preferred aircraft design has the following additional aerodynamic elements (FIG. 5):
1. Vertical nose empennage 14 having rudder surfaces 15.
2. Ventral nose fin 16.
3. Ventral tail fin 17.

Figure 5:
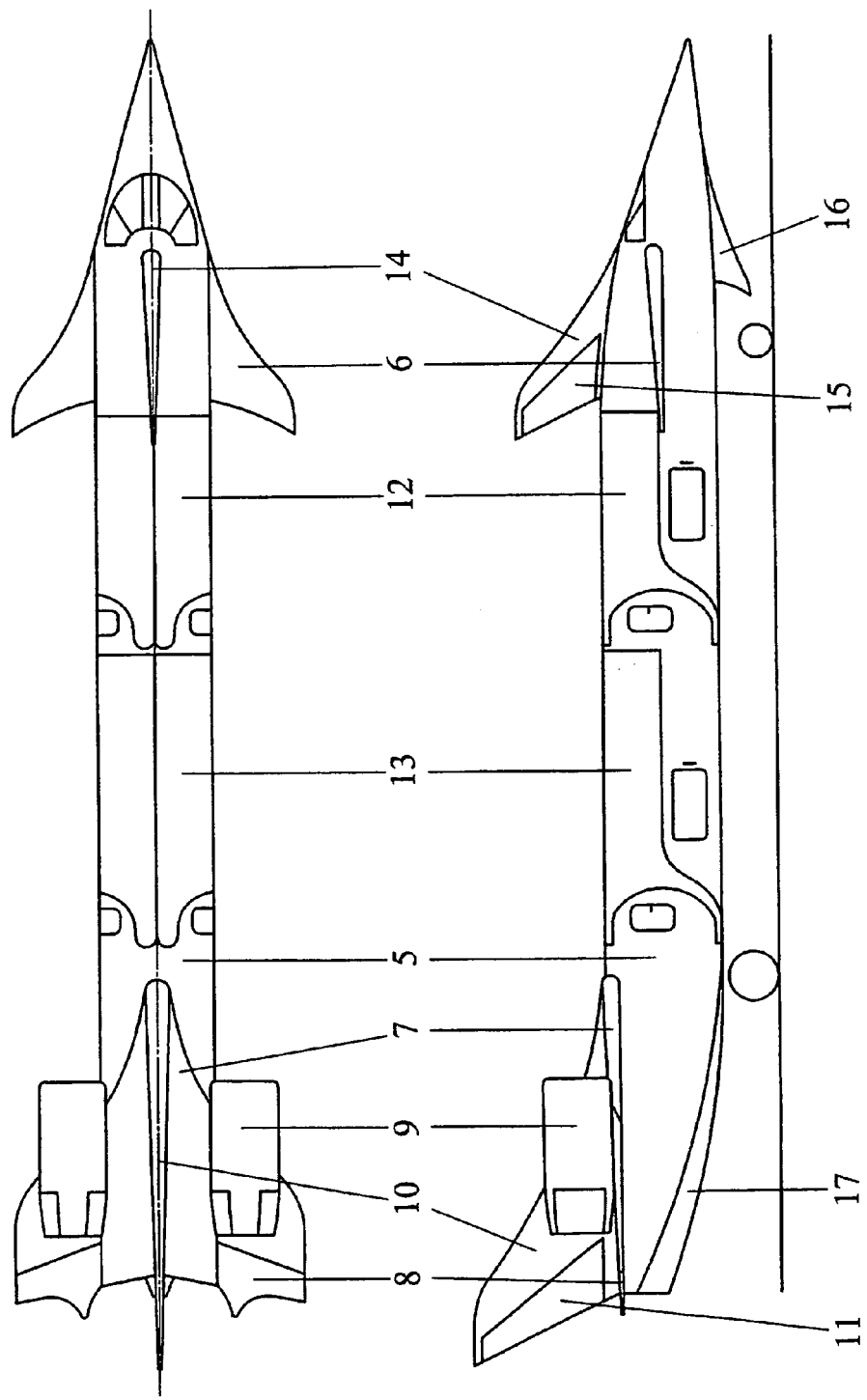
FIG. 5 is an aircraft having two pairs of takeoff and landing wings in the retracted position in two projections.
Figure 6:
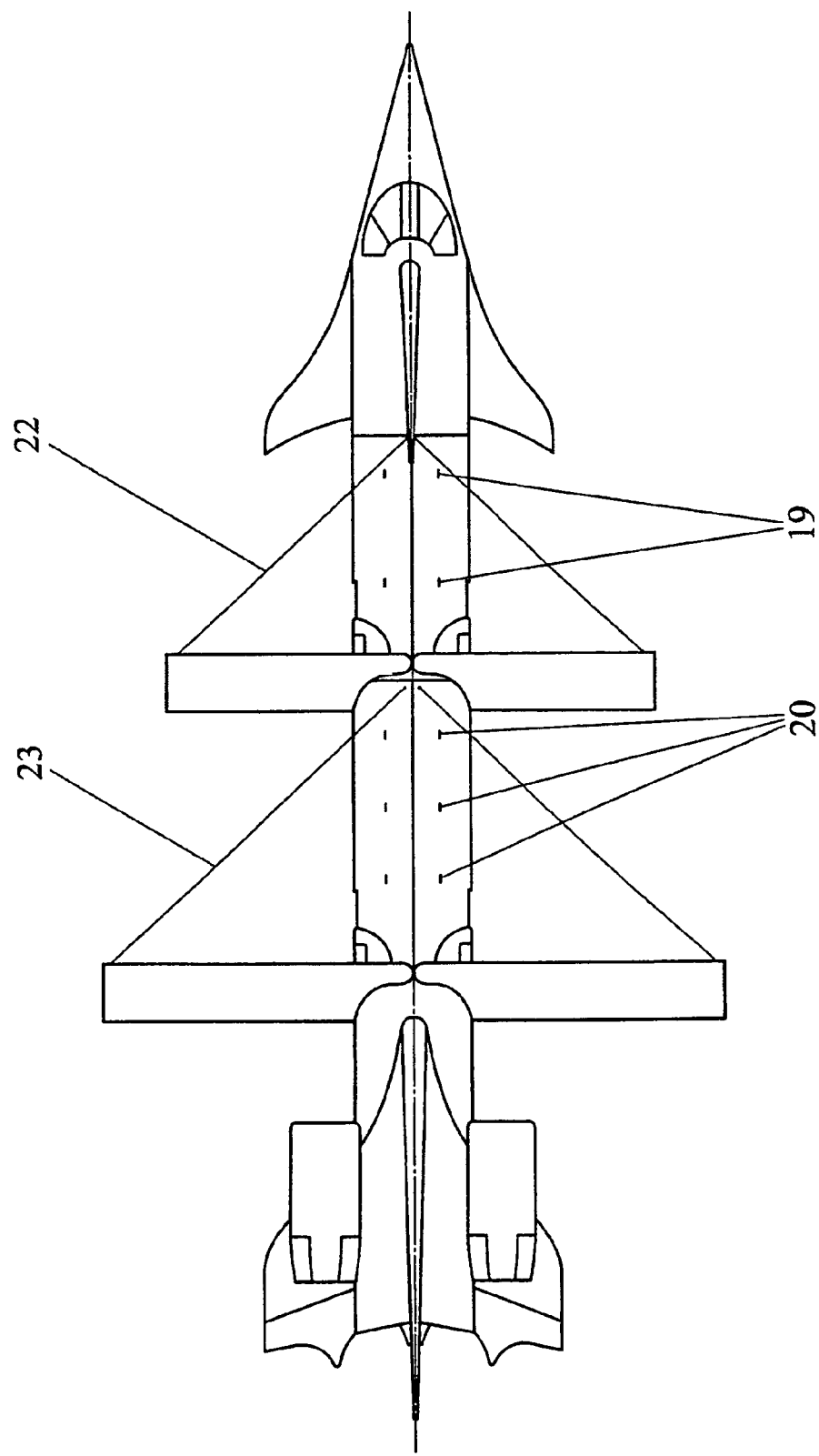
FIG. 6 is a view of an aircraft having two pairs of takeoff and landing wings positioned at 90°.
Figure 7:
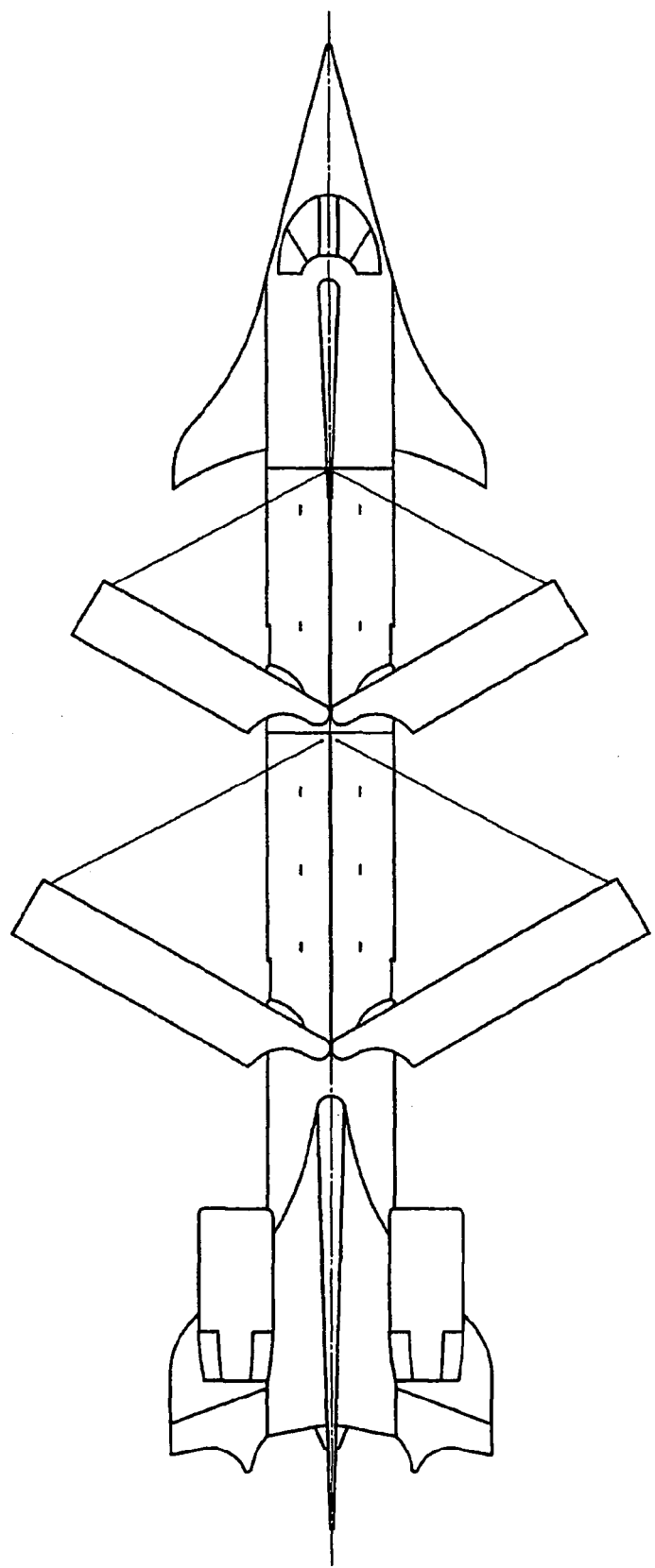
FIG. 7 is a view of an aircraft having two pairs of takeoff and landing wings positioned at 60°.

When the aircraft is parked, the takeoff and landing wings are retracted (FIG. 5). When the aircraft taxis to the holding point, the angle setting mechanism moves the takeoff and landing wings to the takeoff position. Depending on a variety of technical and weather conditions, the aircraft can take off with the takeoff and landing wings set at 90° (FIG. 6), 60° (FIG. 7), 30° (FIG. 8), or at angles close to any of these values. After the aircraft has taken off, the angle setting mechanism begins reducing the setting angle of the takeoff and landing wings as the aircraft indicated speed rises. Simultaneously, the area of the takeoff and landing wings is reduced relative to the approach airflow. Once the takeoff and landing wings have been retracted completely (FIG. 9), the aircraft indicated speed is sufficient for flying on the horizontal nose and tail empennages, whereupon the aircraft is accelerated to cruising speed. In preparation for landing, the crew reduces the aircraft indicated speed to an allowable air pressure indicated speed, whereupon the takeoff and landing wings begin moving out to the landing position as the aircraft indicated speed is lowered to its landing value. The aircraft lands with the takeoff and landing wings extended to 90° (FIG. 6). In turbulent conditions, the aircraft can land with the takeoff and landing wings extended to, or close to, 60° (FIG. 7).

The principal components of the aircraft design are described below.

TAKEOFF AND LANDING WINGS. In a cylindrical fuselage, the space occupied by the takeoff and landing wings in their integrated position is the fuselage volume used the least, that is, integration of the takeoff and landing wings into the fuselage surface does not increase the diameter thereof (FIG. 1).

Takeoff and landing wings 1 and 2 (FIG. 1) have a variable or invariable cross-sectional profile of a turbine blade, which, in this case, implies the profile of a single vertical section and that the profiles of several vertical sections may vary along the full length of the takeoff and landing wings. Variable cross profile takeoff and landing wings may include deflectable slats, deflectable flaps, or other elements intended to vary the profile of the takeoff and landing wings. Takeoff and landing wings of an invariable cross profile, though, are a simpler and more reliable design, which is dealt with below.

Figure 8:
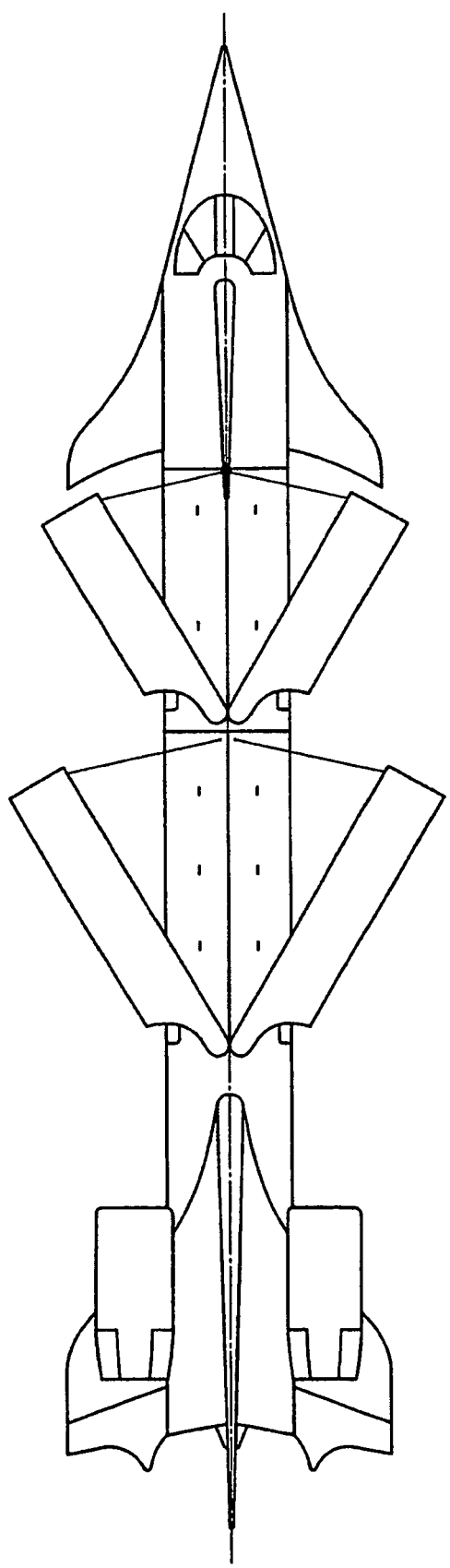
FIG. 8 is a view of an aircraft having two pairs of takeoff and landing wings positioned at 30°.
Figure 9:
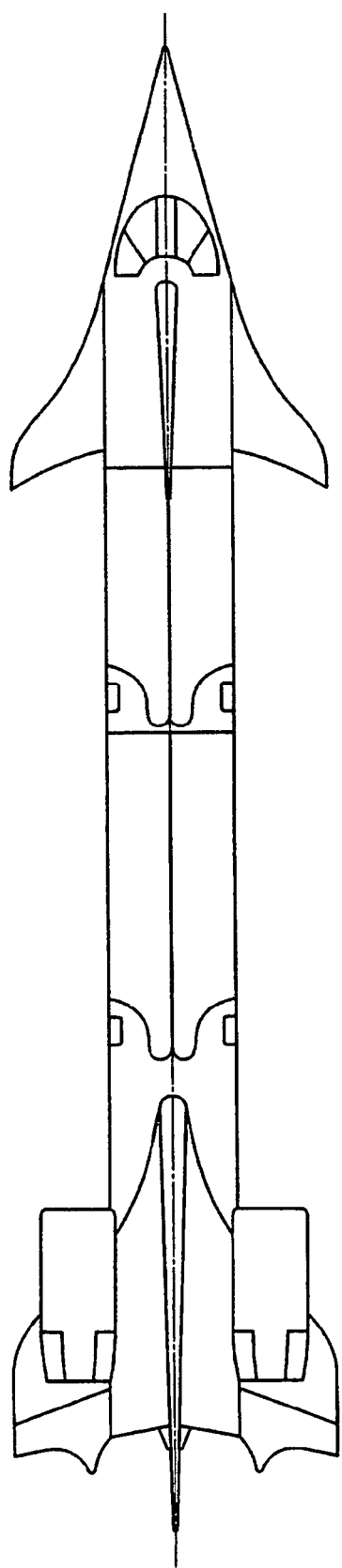
FIG. 9 is a view of an aircraft having one pair of takeoff and landing wings in the retracted position.

Takeoff and landing wings are attached to the fuselage through fitting units enabling the takeoff and landing wings to turn about the fitting units for movement into the extended position at takeoff and landing and into the retracted position in cruising flight and when the aircraft is parked. Each takeoff and landing wing is provided with two fitting units in the upper and lower parts of the fuselage, respectively. The fitting units of each takeoff and landing wing are spaced vertically of the fuselage to a maximum possible distance such that the lower and upper fitting units of each pair of takeoff and landing wings are in an immediate proximity of one another, and the axes of revolution of the fitting units in the left and right takeoff and landing wings of each pair are meshed. This design allows synchronous movement of the left and right takeoff and landing wings of each pair. The axes of revolution of the fitting units of each takeoff and landing wing lie in the same plane of the fuselage cross-section and are parallel to the axis of symmetry of said section. When retracted, the takeoff and landing wings are positioned such that the leading edge of each takeoff and landing wing runs in plan along the longitudinal axis of symmetry of the fuselage away from the respective fitting unit to the nose part of the fuselage (FIG. 9). The longitudinal axis of symmetry of the fuselage is the longitudinal axis of symmetry of the fuselage viewed in plan. The aircraft is provided with fuselage locks 19 and 20 to fix the takeoff and landing wings in the retracted position (FIG. 6). When extended, the takeoff and landing wings are positioned such that the leading edge of each takeoff and landing wing is positioned in plan at an angle to the longitudinal axis of symmetry of the fuselage (FIGS. 6, 7, and 8). The maximum angle may be greater insignificantly than 90°.

Figure 10:
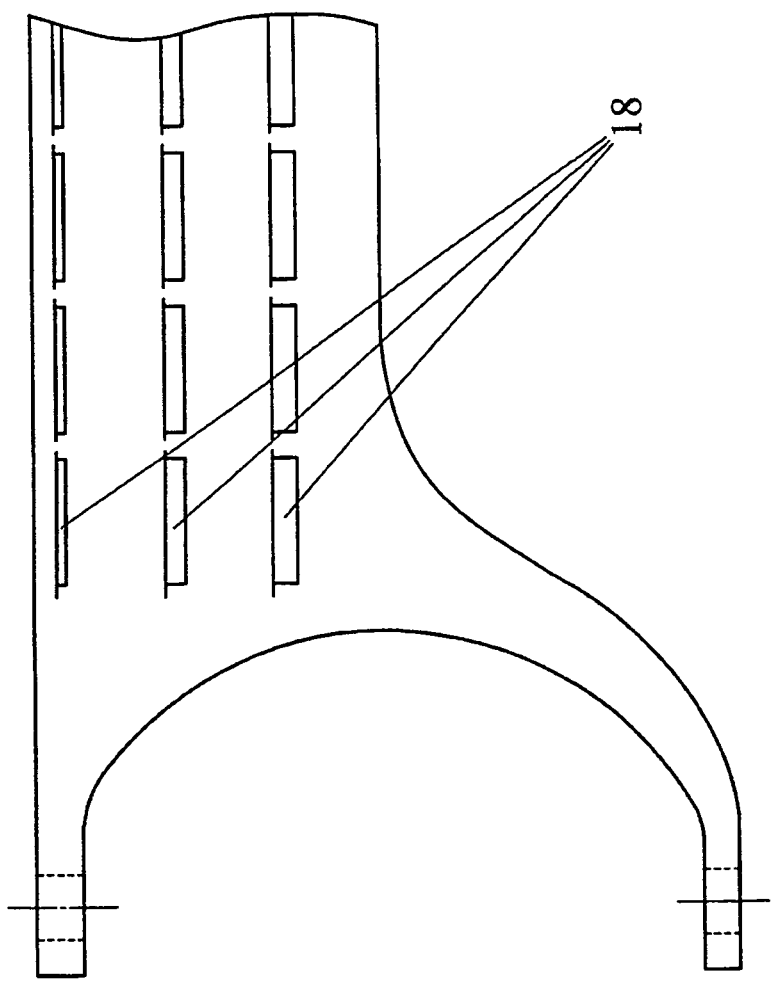
FIG. 10 is a detail of the takeoff and landing wings having slot shutters.

Each invariable profile takeoff and landing wing is provided lengthwise with slots 4 (FIG. 1) for redirecting air from the inner zone of the takeoff and landing wing into its outer, more rarefied zone. This technique is common in modern aircraft using slats and flaps. The upper slots simulate airflow redirection by a slat, and the middle and lower slots simulate airflow redirection by a two-slot flap. Air redirection to the outer zone helps create a laminar flow over the outer surface of the takeoff and landing wing and improve takeoff and landing wing resistance to stalling. The slots of the takeoff and landing wings are provided with shutters on the outer side of the takeoff and landing wings. The axes of revolution of the shutters lie on the upper edges of the shutters (FIG. 10). The shutters are spring-biased in the direction of closure, and the shutters are closed in the direction of the trailing edge of the takeoff and landing wing. When closed, the outer surface of the shutters is an extension of the outer surface of the takeoff and landing wings. When the takeoff and landing wing deflects from its retracted position in flight air pressure on the inner surface of the takeoff and landing wing is greater than the air pressure on the outer surface of the takeoff and landing wing, and the shutters open under the effect of air pressure differential. In an alternative takeoff and landing wing design, the shutters are opened and closed by controls.

The cross profile of a takeoff and landing wing has the cross-sectional shape of a turbine blade of aerodynamic properties that have not raised doubts for a long time already. In a traditional aircraft, the shutters may have one slot, or two or three slots. The number of slots in a flap is matched by the number of flap sections, and the larger the number of sections the smoother the flap cross profile is. The cross profile of a three-slot flap in a landing position is closest to the cross profile of a turbine blade, that is, the designers' desire to develop a relatively complicated three-slot design is motivated by their desire to develop the smoothest possible cross profile of a flap, with the turbine blade profile as an ideal alternative.

The invariable cross profile design of a takeoff and landing wing is capable of withstanding high aerodynamic loads because it lacks movable elements to vary the takeoff and landing wing profile. The fitting units of each takeoff and landing wing are spaced at a distance close to the fuselage diameter (FIG. 5) to take the maximum load off the fitting units and the root section of the takeoff and landing wing exposed to bending and torsional forces in flight. In an aircraft design having two pairs of takeoff and landing wings, the lift produced by the takeoff and landing wings is transmitted to the fuselage through eight fitting units that can easily be made strong, reliable, and capable of withstanding very high loads. When retracted, the takeoff and landing wings locked in their retracted position increase the bending and torsional stiffness of the fuselage.

In terms of wing location, takeoff and landing wings are high-positioned planes. This position gives high roll stability at takeoff and landing because its lift points are above the aircraft center of gravity.

The 90° position of a takeoff and landing wing is an equivalent of a straight wing that is considered best in aerodynamics because it does not cause lateral air flow characteristic of a sweptback wing. When a takeoff and landing wing is deflected to a maximum angle, its root section between the upper and lower fitting units is in mechanical contact with the fuselage stop and relieves partially the load on the variable angle setting mechanism at a maximum Cx of the takeoff and landing wing.

An important aspect of this aircraft design is that the takeoff and landing wings are retracted against the air flow. In case of jamming, failure or disrepair of the variable angle setting mechanism, air flow pressure can help set the takeoff and landing wings in the landing position. The principle of retraction against the air flow has long been used successfully in the nose landing gear extending and retracting systems of many modern aircraft.

Figure 11:
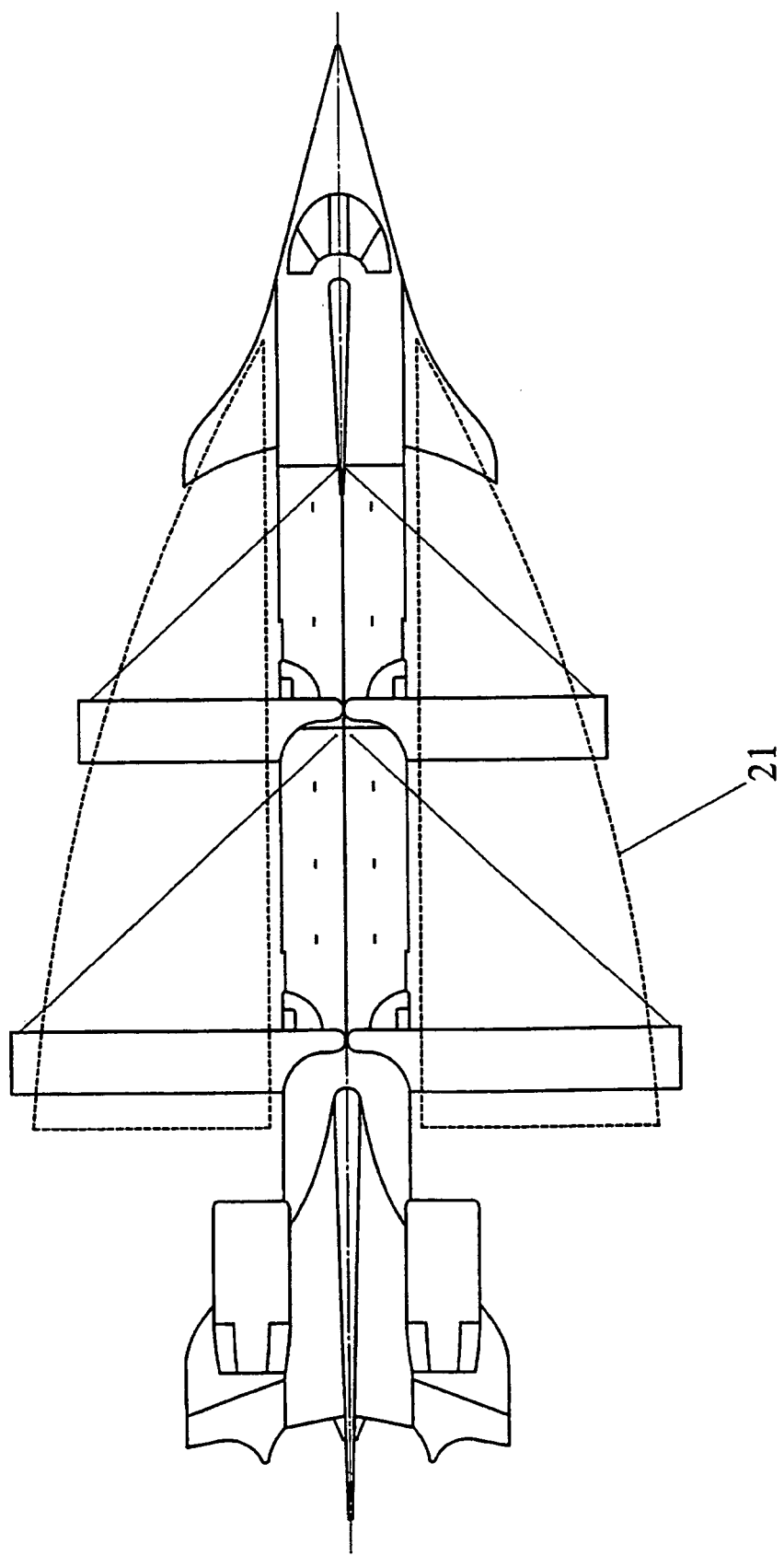
FIG. 11 is a view of an aircraft having two takeoff and landing wings, with an imaginary line extending across the cantilevers of the horizontal nose empennage and cantilevers of the takeoff and landing wings.

This aircraft design is unordinary because the nose edges are swept forward in the intermediate position of the takeoff and landing wings. The Russian S-37 aircraft regarded as a good prospect of the fifth generation has been demonstrated that it can fly with wings swept forward. Swept-forward wing aircraft, however, have a serious problem—pitch stability. The present aircraft design is devoid of this problem because:
1. A shorter takeoff and landing wing has a short span and cannot cause unpredictable pitching of the aircraft.
2. With the angle of attack of the aircraft increasing unpredictably, the lift of a long aft takeoff and landing wing increases by a greater magnitude than that of the forward takeoff and landing wing to end pitching.
3. The imaginary line 21 extending across the cantilevers of the horizontal nose empennage and the cantilevers of the takeoff and landing wing, its leading edges swept back, is an outline of a sweptback wing (FIG. 11). With the leading edges of the takeoff and landing wing swept back, aircraft pitching is approximately the same as that of an aircraft having a sweptback wing of outlines following the line 21.

Traditional aircraft designs have a center of gravity concept. A critical parameter, its value is carefully monitored by the crew and special service on every flight, because the center of gravity shifting beyond its maximum limits can end in aircraft disablement, at best, or catastrophe, at worst. Approach to the center of gravity in the present aircraft design is slightly different. At takeoff and landing, its lift is produced by the horizontal nose empennage, the forward takeoff and landing wing, the aft takeoff and landing wing, and the horizontal tail empennage such that the lift points are spaced widely along the length of the aircraft fuselage. With an aft aircraft center of gravity, the extension angle of the aft pair of takeoff and landing wings may be greater than that of the forward pair of takeoff and landing wings, while with a forward center of gravity, the extension angle of the forward pair of takeoff and landing wings may be larger than that of the aft pair of takeoff and landing wings. This specific design helps significantly to expand the range of operating aircraft centers of gravity without sacrificing safety at all.

In a transport aircraft version, the retracted takeoff and landing wings do not impede movement of ramps to the entrance door or maintenance equipment being moved around. An aircraft of this design takes significantly less parking and hangar space than traditional aircraft of the same class.

The takeoff and landing wings may contain fuel tanks, as is common practice in modern aircraft, but fuel tanks may be located partially or completely in the fuselage as well.

The takeoff and landing wings are held in any position by ropes 22 and 23 (FIG. 6). When a rope system is used, the motors of the variable angle setting mechanisms of the takeoff and landing wings are not required to be high-powered because a rope operates at a maximum possible arm. The fitting units and the root section of the takeoff and landing wings experience a lesser load in this design. When the takeoff and landing wings are retracted in flight, the aircraft flies at a very high speed at the end of retraction and the aerodynamic loads on the cantilevers are significant, with a likelihood of vibration and flexure of the takeoff and landing wings. In this situation, the rope system alone will, by aligning the point of rope entry into the fuselage and the point where the rope is fixed to the cantilever, fix each takeoff and landing wing in the retracted position locks 19 and 20 of the fuselage (FIG. 6). The rope system has a small size, and is reliable, simple, and capable to withstanding very high loads. These features in combination make this design very reliable and safe. The variable angle setting mechanism of the takeoff and landing wings may be designed as described below. This mechanism is intended to control one pair of takeoff and landing wings. The number of variable angle setting mechanism of the takeoff and landing wing depends on the number of takeoff and landing wing pairs used in a specific aircraft model, all the mechanisms being required to operate in coordination.

Figure 12:
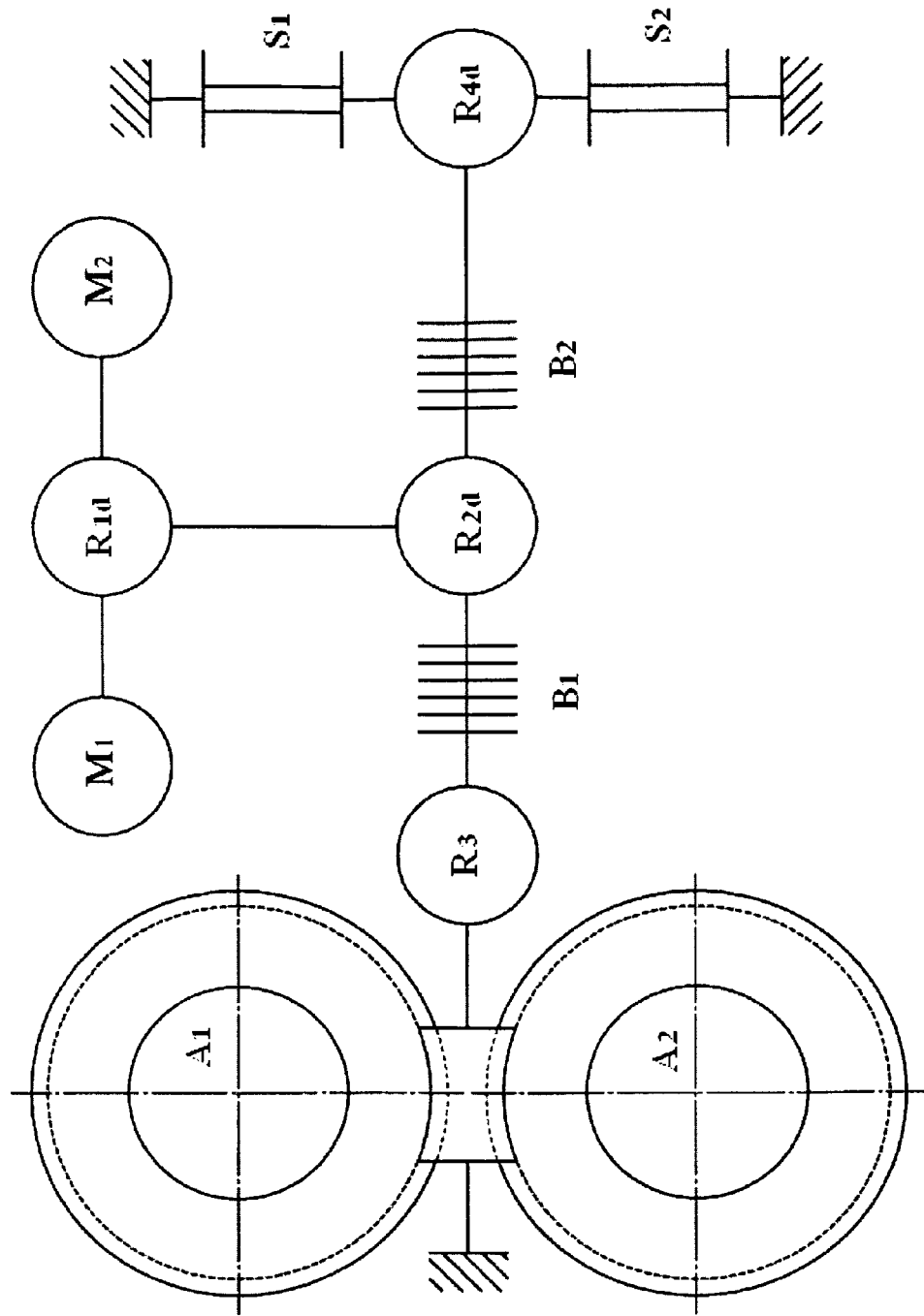
FIG. 12 is a diagrammatic view of the mechanism controlling one pair of takeoff and landing wings.

Each variable angle setting mechanism of a pair of takeoff and landing wings comprises a rope system and an axle system to enable the axles of the takeoff and landing wings to turn within the working angle range. Two hydraulic control motors M1 and M2 operated from independent hydraulic systems rotate, through their respective half-axles, the output shaft of a reducing gear R1$d$ provided with a differential gear (FIG. 12). The output shaft of the reducing gear R1$d$ is also the input shaft of a reducing gear R2$d$ provided with a differential gear. One of the half-axles of the reducing gear R2$d$ is extended through a multiple-disk brake B1 to turn the input shaft of a reducing gear R3 having an output shaft to turn the axles A1 and A2 of the upper fitting units of the takeoff and landing wings simultaneously through a worm gear. To improve synchronization in the movement of the left and right takeoff and landing wings, the rotary axles of the lower fitting units are meshed. The other half-axle of the reducing gear R2$d$ is extended through a multiple-disk brake B2 and rotates the input shaft of a reducing gear R4$d$ provided with a differential gear. The half-axles of the reducing gear R4$d$ rotate the spools S1 and S2 of the rope system, one end of each rope being secured in the rope system spool and the other end of the rope attached to the cantilever of a respective takeoff and landing wing.

When the takeoff and landing wings are extended before takeoff, hydraulic fluid is fed under low pressure into the cylinders of the multiple-disk brake B2 to tension the ropes as needed. When the takeoff and landing wings are retracted after the aircraft has landed, hydraulic fluid is fed under low pressure into the cylinders of the multiple-disk brake B1 for the ropes to be wound tightly on the spools S1 and S2. When the takeoff and landing wings are extended in flight, hydraulic fluid is fed under low pressure into the cylinders of the multiple-disk brakes B1 and B2 to partially relieve the load on the control motors M1 and M2. When the transmission is stopped completely in any of the intermediate positions thereof, the full hydraulic fluid pressure is switched over by slide valves from the hydraulic control motors M1 and M2 into the cylinders of the multiple-disk brakes B1 and B2 to stop the control motors and, at the same time, interlock the transmission by the two brakes.

In the event of failure of either of the control motors, the output shaft of the reducing gear R1$d$ will be rotated by the good motor at half speed, and rotation of the faulty motor will be interlocked. If a load imbalance develops between the rope and axle systems, the differential gear of the reducing gear R2$d$ will switch over the load to the less loaded system automatically. In this way, an equal load will always be maintained between the rope and axle systems. Where load imbalance develops between the spools S1 and S2, the differential gear of the reducing gear R4$d$ will switch over the load to the less loaded spool automatically. Accordingly, tension of the left and right ropes will always be maintained equal.

The reducing gears R1$d$, R2$d$, and R4$d$ can be used without alterations in their reduction ratios in the variable angle setting systems of the takeoff and landing wings provided with ropes of different length, for example, short ropes in the variable angle setting system of the forward pair of takeoff and landing wings and long ropes in the variable angle setting system of the aft pair of takeoff and landing wings. In this case, the reduction ratio of the reducing gear R3 changes depending on the length of the ropes wound on the spools S1 and S2.

Movement of the left and right takeoff and landing wings is blocked by two multiple-disk brakes and a worm gear in any stationary position, except for the retracted position, of the takeoff and landing wings. In the retracted position of the takeoff and landing wings, these blocks are reinforced by the retracted position locks of the fuselage.

The ropes and their outlet seals need to be replaced periodically in an operational aircraft. Replacement is a sufficiently simple procedure that requires the takeoff and landing wings to be extended at 30°, the rope outlet seals detached, the ropes unfastened from the takeoff and landing wings, and the rope spools removed. Next, new spools together with the ropes and outlet seals are put in place, the rope ends are fastened to the takeoff and landing wings, and the takeoff and landing wings extended further to 90°. As the takeoff and landing wings are extended to the 90° position, a light force applied by the brake B2 takes up the rope slack and gives them the tension needed. The procedure is completed by placing the takeoff and landing wings in the retracted position. Replacement of the ropes and outlet seals does not require any adjustment at all—this mechanism makes all adjustments automatically. The variable angle setting mechanism of the takeoff and landing wings is relatively simple in design and is reliable. It does not require the use of expensive materials or components.

It is reasonable to consider making the takeoff and landing wings from a titanium alloy for an aircraft of the present design. Such takeoff and landing wings reduce Cx and lower aircraft weight still further without sacrificing their strength. Titanium alloy takeoff and landing wings have a relatively high cost that will be paid off quickly in aircraft operation.

ELEVATOR 6 is located in the nose part of the aircraft and functions as a fully controlled horizontal nose empennage (FIG. 5).

The stabilizer and elevator are positioned in the aft part of traditional aircraft. This position is disadvantageous for two reasons. First, with the flaps down, the aircraft is given nose-down pitching. To keep the relative pitching balance, the stabilizer is moved to nose-up pitching in which it produces a negative lift. As the elevator is deflected upward to pull the aircraft up it produces an additional negative lift. In other words, when the aircraft starts to climb in a configuration with the mechanical elements extended, the negative lift of the elevator and stabilizer reduces the lift produced by the wing significantly. As a result, the aircraft slumps over the wing and then begins a climb. The history of aviation is replete with examples when aircraft attempting to execute a missed approach in a critical situation in the landing configuration at the practicably lowest altitude were short of a few meters of altitude to safely complete the flight. Second, the stabilizer partially obstructs aerodynamic airflow around the elevator and reduces the efficiency thereof.

The situation is exactly the opposite in the aircraft of the present design. The elevator that is adjusted to an angle needed to neutralize nose-down pitching created by the takeoff and landing wings produces a positive lift. The elevator angle of attack increasing as the aircraft starts climbing gives added increment to the lift as well. That is, when the aircraft attempts to execute a missed approach in the landing configuration the elevator contributes to the lift produced by the takeoff and landing wings. A missed approach procedure is executed without slumping, and the aircraft responds immediately to an increase in the elevator angle of attack. A further advantage of this design is that the aerodynamic airflow around the elevator is not obstructed by other elements of the aircraft design, making it more efficient.

AILERONS 8 are located on the horizontal tail empennage 7 such that the upper surfaces of the ailerons are in the lower zones the gas jet issuing from their respective engines (FIG. 5). A specific of this roll control pattern is that the trailing part of an aileron deflected up moves into the engine gas jet to deflect it and improve significantly the aircraft roll response. To avoid impact upon contact with the engine gas jet, the ailerons 8 have teeth in the trailing edges thereof (FIG. 5). An aileron tooth is moved slightly toward the longitudinal axis of symmetry of the fuselage in plan relative to the center of the engine gas jet. As the aileron is deflected upward the tooth moves toward the center of the engine gas jet because of the arrow-like position of the axis of revolution of the aileron. An aileron of this design moving into the engine gas jet contributes to a smooth and efficient roll response of the aircraft. When the ailerons are deflected downward, their efficiency is augmented by the Coanda effect. Designs in which the aileron functions are performed by engines developing a thrust vector variable in the vertical plane cannot, however, be used in the roll control channel.

ENGINES 9 are positioned on top of the horizontal tail empennage 7 (FIG. 5). Located in this position, their air intakes are not obstructed by the aft takeoff and landing wings. The thrust reversal shutters are moved over in the horizontal plane such that the engine thrust reversal can be used safely until the aircraft stops completely. The engine cowls can still be opened from a stepladder, an important consideration for maintenance (FIG. 5).

Figure 13:
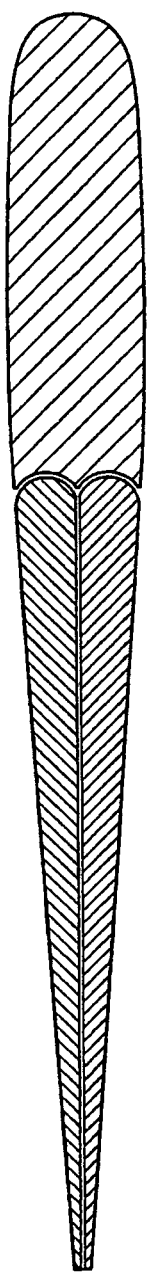
FIG. 13 is a view of two-section rudder surfaces of the keel.
Figure 14:
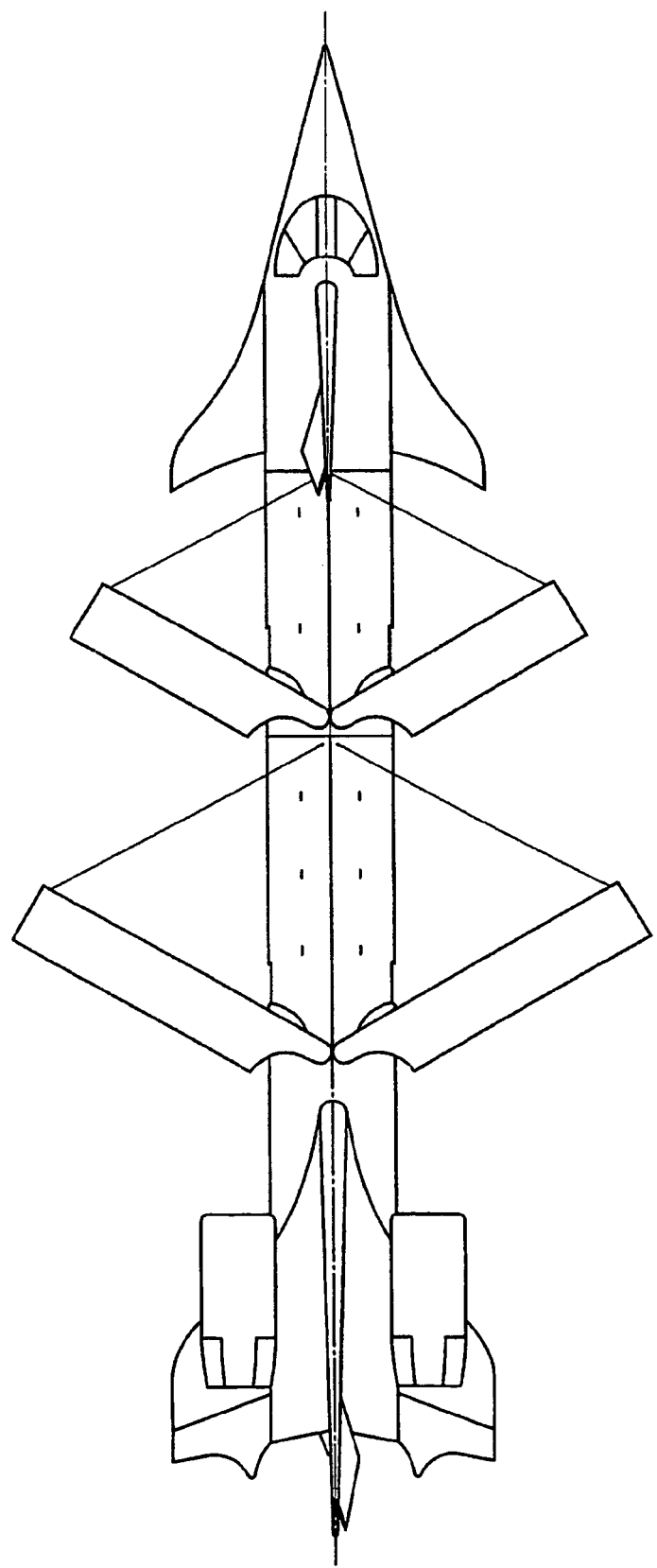
FIG. 14 is a view showing deflection of the two-section rudder surfaces of the keel—left on the forward keel and right on the aft keel.
Figure 15:
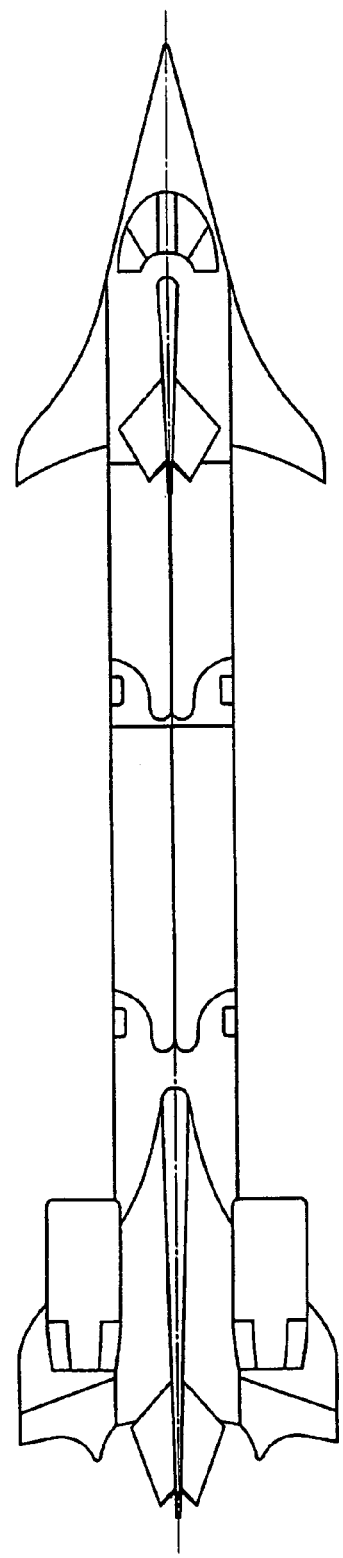
FIG. 15 is a view showing deflection of the two-section rudder surfaces of the forward and aft keels in the opposite directions when they are used as spoilers.
Figure 16:
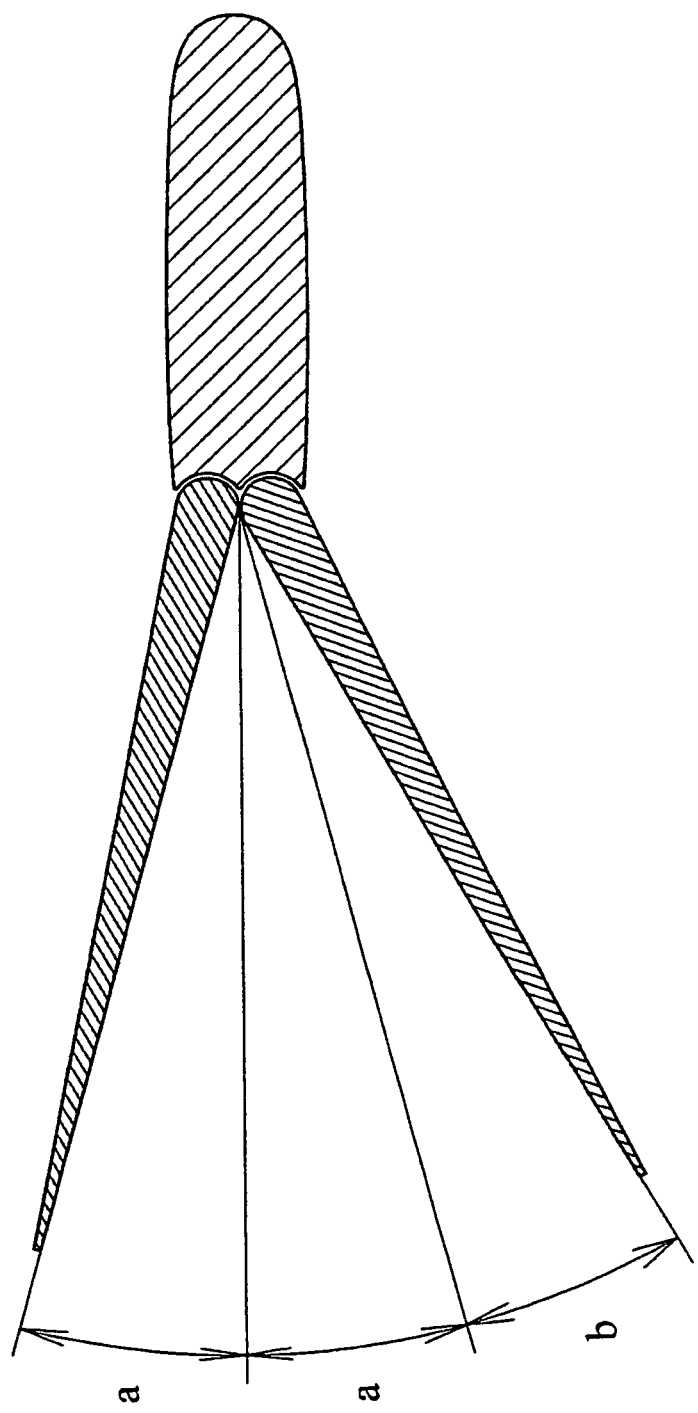
FIG. 16 is a view showing deflection of the two-section rudder surfaces of the keel combining the functions of the yaw rudder and spoiler.
Figure 17:
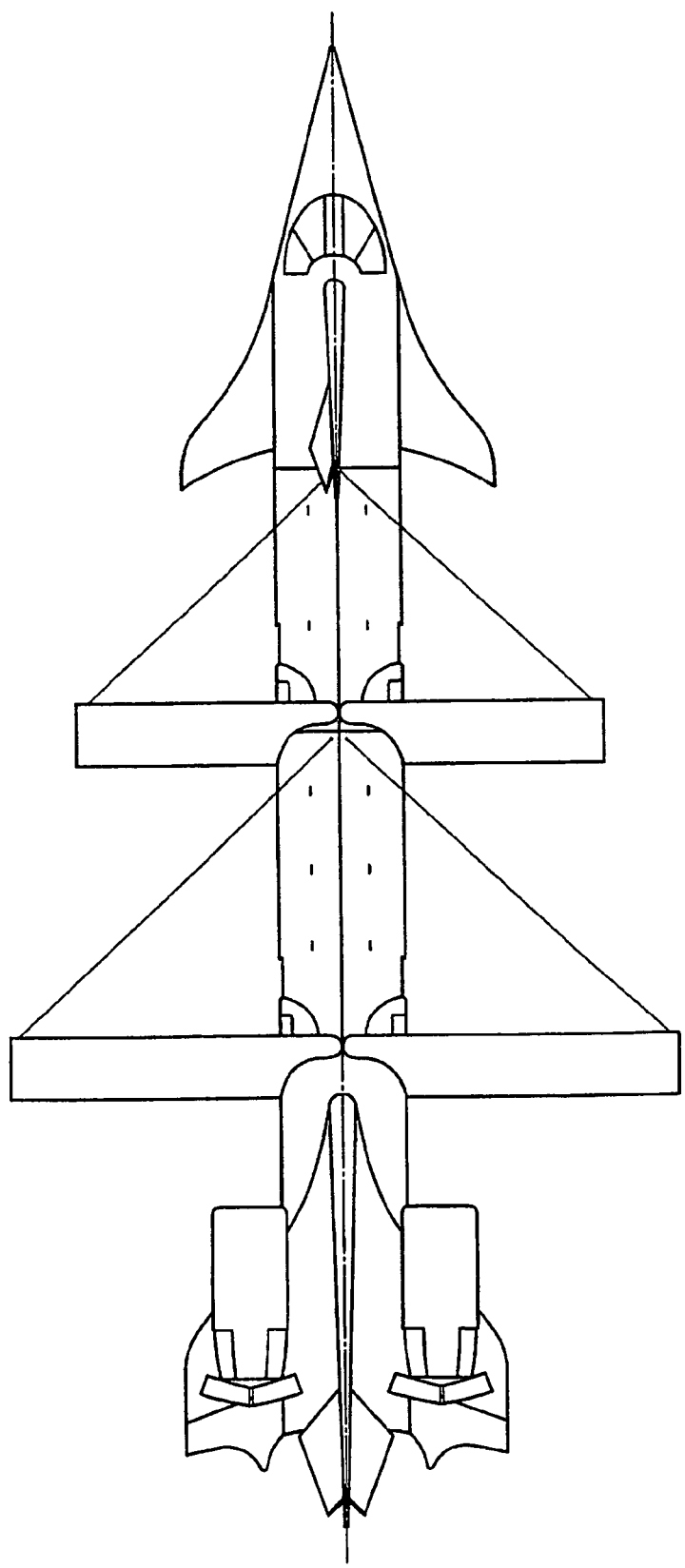
FIG. 17 is a view of the aircraft configuration on landing, with the two-section rudder surfaces of the aft keel deflected at maximum angles in the opposite directions and the two-section rudder surfaces of the forward keel deflected to the left by reversing the thrust of the engines.

VERTICAL EMPENNAGE. The vertical empennage comprises the following elements: a forward keel 14, a tail keel 10, a forward ventral fin 16, and an aft ventral fin 17 (FIG. 5). The keels are positioned vertically in the nose and tail parts of the fuselage such that the longitudinal axis of symmetry of each keel in plan is in line with the longitudinal axis of symmetry of the fuselage (FIG. 5). The ventral fins 16 and 17 are intended to give added directional stability to the aircraft and extend vertically downward from the nose and tail parts of the fuselage such that the longitudinal axis of symmetry of each ventral fin in plan coincides with the longitudinal axis of symmetry of the fuselage. The rudder surfaces 15 and 11 of the keels 14 and 10 (FIG. 5) consist of two sections each (FIG. 13). The rudder surfaces of the keels function as yaw rudders and spoilers. The sections of the forward and aft keels are deflected to identical angles in different directions for directional control (FIG. 14). This directional control type yields the greatest effect since the rudders of the forward and aft keels use a long arm. The two-section rudder surfaces of the keels can be used as a power-consuming spoiler system as well (FIG. 15). With the functions of the yaw rudder and spoiler combined, one of the sections is deflected by an angle a and the other, by an angle a+b (FIG. 16). As the takeoff and landing wings begin extension in flight, there is a slight nose-up pitching that is neutralized by the forward spoilers being extended slightly or by the elevators being put over to nose-down pitching. After the shock absorbers of the main landing gear struts have been compressed on landing, the aft keel sections change over to spoiler operation and are raised to a maximum angle automatically, while the forward keel sections continue to function as the yaw rudder during the landing run (FIG. 17). In combination with engine thrust reversal, the aircraft is effectively braked at the braking point in the aft part of the fuselage. The unobstructed yaw rudder activated in the nose part of the aircraft has the greatest efficiency in this situation. This pattern makes the takeoff and landing path of the aircraft absolutely steady in a strong cross-wind and on a slippery runway. The energy absorbing brakes and the possibility of engine thrust reversal until the aircraft stops completely help reduce the length of the landing run or in an aborted flight as much as is reasonably possible.

Figure 18:
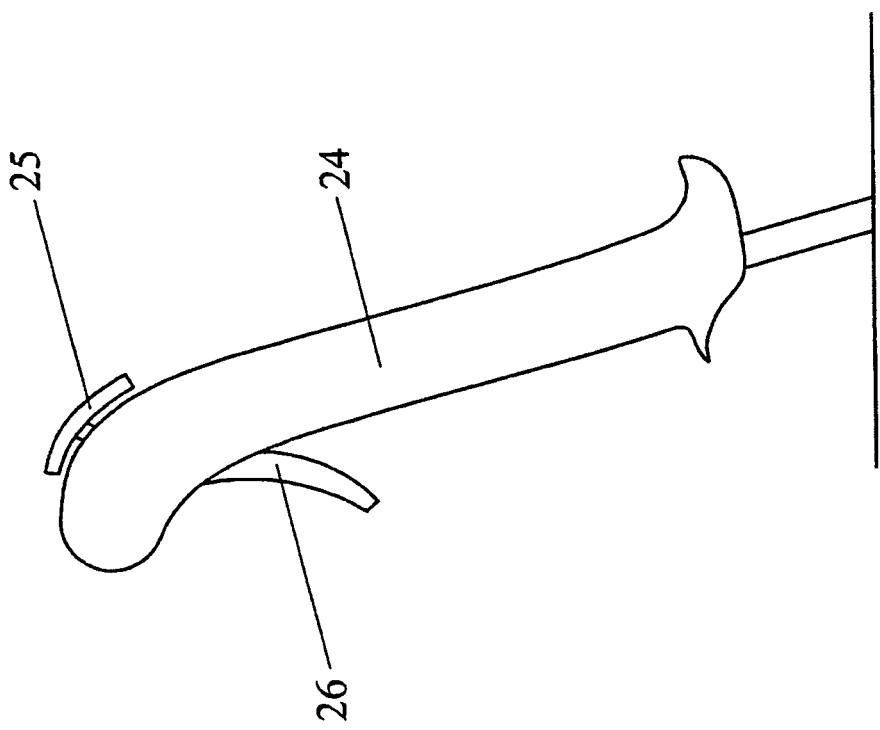
FIG. 18 is a view of the spoiler system control handle.

When the nose and tail spoilers are extended simultaneously, an aircraft of the present design descends similarly to an aircraft of traditional design. The energy absorbing system of spoilers in the nose and aft parts of the fuselage, though, helps expand the range of their uses. If the forward spoilers are extended to an angle larger than the angle to which the aft spoilers are extended, the vertical descent speed (Vy) is increased. If the aft spoilers are extended to a greater angle than the forward spoilers, the indicated speed (Vin) is reduced. A handle 24 to control this system may have push selectors 25 and 26 (FIG. 18). The push selector 25 is used to simultaneously extend and retract the forward and aft spoilers. When the selector 25 is held in the depressed position all the spoilers are extended simultaneously, and when it is released all the spoilers are retracted simultaneously. The push selector 26 is used to release locks as the spoiler control handle 24 is moved back and forth. Movement of the handle 24 forward or backward alters the balance between the angle to which the forward and aft spoilers are extended. When the handle 24 is moved forward, the forward spoilers only continue to extend, with an increase in Vy. When the handle 24 is moved backward, the aft spoilers only continue to extend, with a decrease in Vin. The spoilers used during descent, therefore, offer extra opportunity to adjust the values of Vy and Vin.

Figure 19:
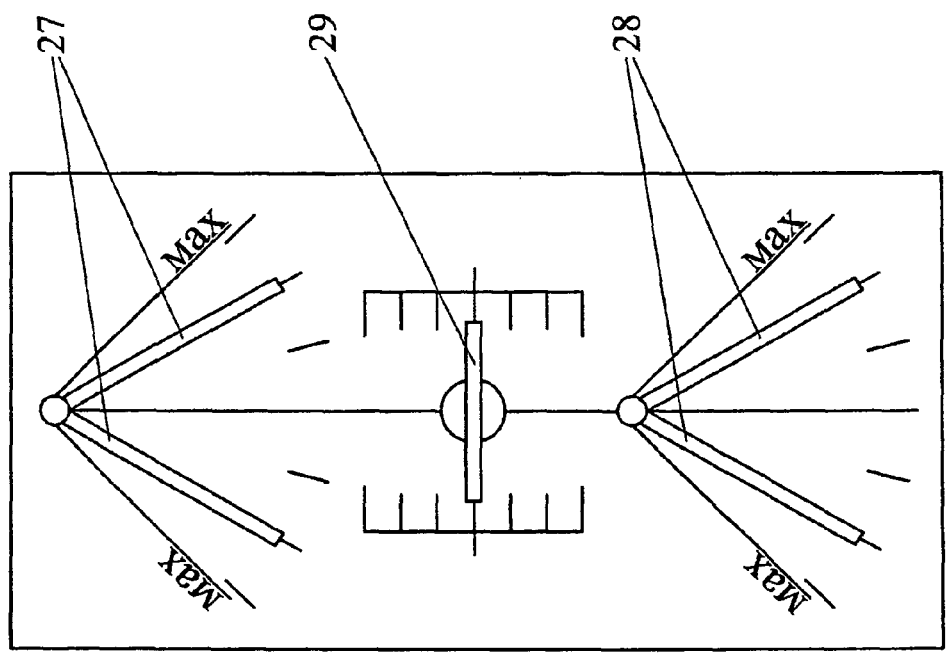
FIG. 19 is a view of the spoiler position indicator.
Figure 20:
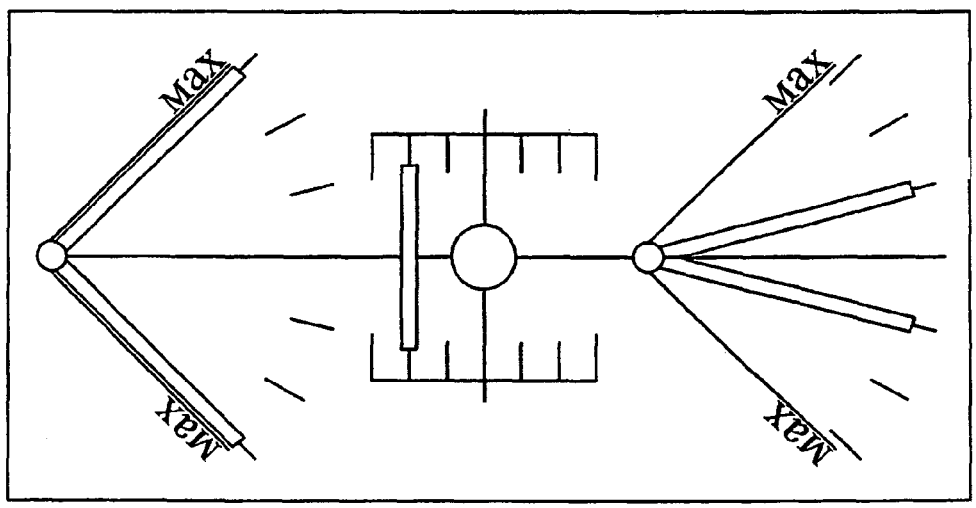
FIG. 20 is a view of the spoiler position indicator.
Figure 21:
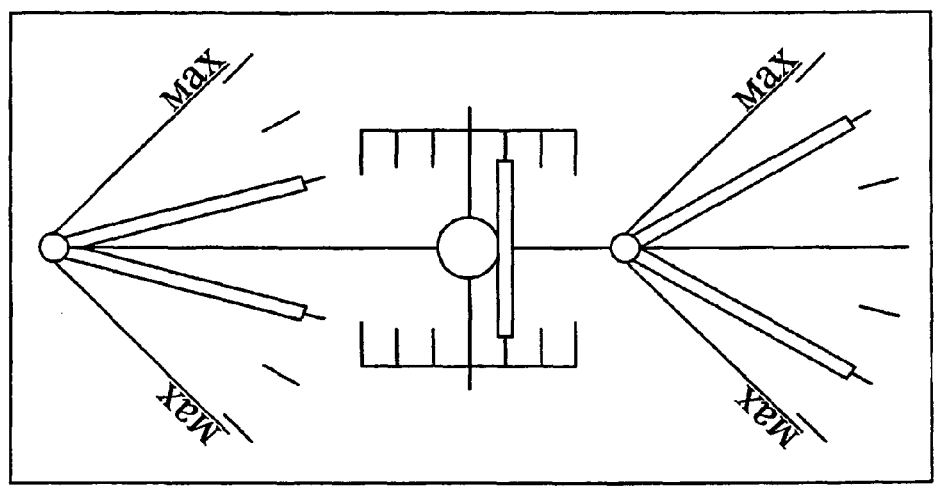
FIG. 21 is a view of the spoiler position indicator.

The spoiler position indicator has forward spoiler extension bars 27, aft spoiler extension bars 28, and a balance bar 29 (FIG. 19). When the forward and aft spoilers are extended simultaneously, for example, to 30°, the balance bar 29 remains in the neutral position (FIG. 19). When Vy is increased, for example, by 30°, the balance bar moves 30° forward (FIG. 20). When Vin is reduced, for example, by 15°, the balance bar moves 15° back (FIG. 21). This indication is simple, comprehensible, and easy to read.

LANDING GEAR. An aircraft of the present design has takeoff and landing wings and engines positioned at a considerable height and, therefore, allows short landing gear struts to be used (FIG. 5). The short landing gear struts used in this aircraft design allows jetway ramps to be used. The short landing gear struts have a small weight and low costs and take up less usable space in the fuselage. The importance of these parameters can be appreciated from the landing gear design of the world-famous Concord and TU-144 supersonic aircraft.

Economic Performance

Aircraft of this design have a minimum possible drag coefficient Cx in the cruising configuration, and fuel requirements are, therefore, significantly lower than they are for traditional aircraft of the same class. For an equal takeoff weight, the payload of an aircraft of this design can, in comparison with a traditional aircraft of the same class, be increased by the fuel weight difference, and can be quite significant on long-distance flights. Wide-scale use of composite materials, in addition to smaller quantities of fuel carried on board, produce a flying vehicle that has good speed and economic characteristics. The fast growth in prices of petroleum products and high environmental standards applied to aviation because of harmful emissions into the atmosphere make this aircraft design quite an appropriate choice.

Applications of Aircraft of the Present Design

An aircraft of this design develops approximately the same takeoff and landing speeds as the traditional aircraft of the same class. No great efforts will be required to organize air traffic control and operation of aircraft of the present design together with modern aircraft of traditional design. Cruising flight levels of aircraft of the present design are higher than those of modern aircraft, an advantage that will allow the airspace to be made less congested in altitude in a heavy air traffic.

The present design is an optimal choice for supersonic aircraft. Elevons used on supersonic aircraft with no tail created occasional control systems, including the opposite response of aircraft to rudder deflection. Course, roll, and yaw stability and easy control of aircraft of the present design in cruising flight compare well with those of a cruise missile fitted with a canard.

It is reasonable to develop an aircraft of the present design for flights at a cruising number M=0.95. The aircraft weight is reduced by lowering the strength and heat resistance of the skin, which results in a subsonic flying vehicle having good speed and economic characteristics.

When used on ship deck, an aircraft of the present design is advantageously distinct for its reasonably small size in a parked position and its ability to fly at low speeds at takeoff and landing.

An aircraft of this design can be used with piloted reusable spacecraft.

Conclusions

The present aircraft design can serve a variety of purposes because it can be used to develop supersonic and subsonic airplanes carrying various payloads and adapted for various applications. It has a good course, roll, and yaw stability and handling at all stages of flight. The aircraft has a small size and is sufficiently simple in design and reliable. An aircraft of the present design is superior to existing modern transport aircraft, or at least is not inferior to them.

In actual fact, this invention is a hybrid of a cruise missile and a transport aircraft having good takeoff/landing and economic characteristics.

What is claimed is:

1. A flying vehicle comprising: a fuselage having an upper and a lower surface and main aerodynamic elements comprising at least one of a vertical nose empennage, a horizontal tail empennage, and a vertical tail empennage, and at least a pair of left and right takeoff and landing wings having a variable or invariable profile of a turbine blade in cross-section joined to the fuselage, each takeoff and landing wing having a leading edge and being attached to the fuselage through two fitting units positioned in the upper and lower surfaces of the fuselage, respectively;

the takeoff and landing wings having an inner and outer wing surface and being capable of turning relative to axes of revolution of the fitting units for movement to an extended position at takeoff and landing and to a retracted position in cruising flight and when parked;

wherein the inner surface of the takeoff and landing wings in the retracted position being in contact with the upper surface of the fuselage, and the outer wing surface of the takeoff and landing wings being an extension of an outer fuselage surface of the fuselage;

wherein the takeoff and landing wings in the retracted position being positioned such that the leading edge of each takeoff and landing wing in plan extends along a longitudinal fuselage axis of symmetry of the fuselage in a direction from the respective fitting unit to the nose part of the fuselage;

wherein the takeoff and landing wings in the extended position being positioned such that the leading edge of each takeoff and landing wing in plan is at an angle to the longitudinal fuselage axis of symmetry of the fuselage.

2. The flying vehicle as claimed in claim 1, wherein the axes of revolution of the fitting units of each takeoff and landing wing extend in the same cross-sectional plane of the fuselage and are parallel to a vertical axis of symmetry of said cross-sectional plane.

3. The flying vehicle as claimed in claim 1, wherein each invariable profile takeoff and landing wing has at least one longitudinal row of slots provided with shutters having an outer shutter surface on the outer wing surface of the takeoff and landing wing, the outer shutter surface of the closed shutters being an extension of the outer wing surface of the takeoff and landing wing, the shutters being spring-biased in the direction of closure and being opened under the effect of the air pressure difference or opened and closed by controls, the shutters being closed in the direction of the trailing edge of the takeoff and landing wing.

4. The flying vehicle as claimed in claim 1, wherein the flying vehicle has two keels having rudder surfaces and a longitudinal keel axis of symmetry positioned vertically on the nose and tail parts of the fuselage, the longitudinal keel axis of symmetry of each keel coinciding in plan with the longitudinal fuselage axis of symmetry of the fuselage.

5. The flying vehicle as claimed in claim 1, wherein the main aerodynamic elements include a horizontal tail empennage having ailerons with upper surfaces wherein engines issuing gas jets having lower zones are positioned on top of the horizontal tail empennage, the ailerons being provided with teeth on a trailing edge of the horizontal tail empennage and positioned on the horizontal tail empennage such that the upper surfaces of the ailerons are in the lower zones of the gas jets issuing from the respective engines.

* * * * *